United States Patent [19]

Aulich et al.

[11] 4,294,811

[45] Oct. 13, 1981

[54] PROCESS FOR MANUFACTURING SI USEFUL FOR SEMICONDUCTOR COMPONENTS FROM QUARTZ SAND

[75] Inventors: Hubert Aulich, Munich; Josef Grabmaier, Berg, both of Fed. Rep. of Germany

[73] Assignee: Siemens Aktiengesellschaft, Berlin & Munich, Fed. Rep. of Germany

[21] Appl. No.: 194,336

[22] Filed: Oct. 6, 1980

[30] Foreign Application Priority Data

Nov. 8, 1979 [DE] Fed. Rep. of Germany ....... 2945141

[51] Int. Cl.³ .............................................. C01B 33/02
[52] U.S. Cl. .................................... 423/350; 423/340
[58] Field of Search ........................ 423/340, 348, 350

[56] References Cited

U.S. PATENT DOCUMENTS

| | | | |
|---|---|---|---|
| 2,215,039 | 9/1940 | Hood et al. | 49/79 |
| 3,650,721 | 3/1972 | Hammel et al. | 65/31 |
| 4,097,584 | 6/1978 | Reuschel et al. | 423/348 |
| 4,247,528 | 1/1981 | Dosaj et al. | 423/350 |

FOREIGN PATENT DOCUMENTS 2623413  8/1977  Fed. Rep. of Germany .

*Primary Examiner*—G. O. Peters
*Attorney, Agent, or Firm*—Hill, Van Santen, Steadman, Chiara & Simpson

[57] ABSTRACT

Relatively pure Si (having less than about 1 ppm of detrimental impurities therein) is obtained from ordinary quartz sand by uniformly admixing such sand with suitable glass-forming materials, such as boron oxide and alkali-metal carbonates or oxides, melting such admixture to form a glass, annealing the glass so as to obtain a phase separation comprised of an $SiO_2$— rich phase and an impurity-rich phase, extracting the impurity-rich phase via strong acid, such as nitric acid, washing and drying the remaining glass and reducing such glass with carbon-containing compounds, such as graphite, sucrose, starch, etc., in an electric arc. The so-obtained relatively pure silicon is suitable for fabrication into semiconductor components, such as solar cells.

18 Claims, 1 Drawing Figure

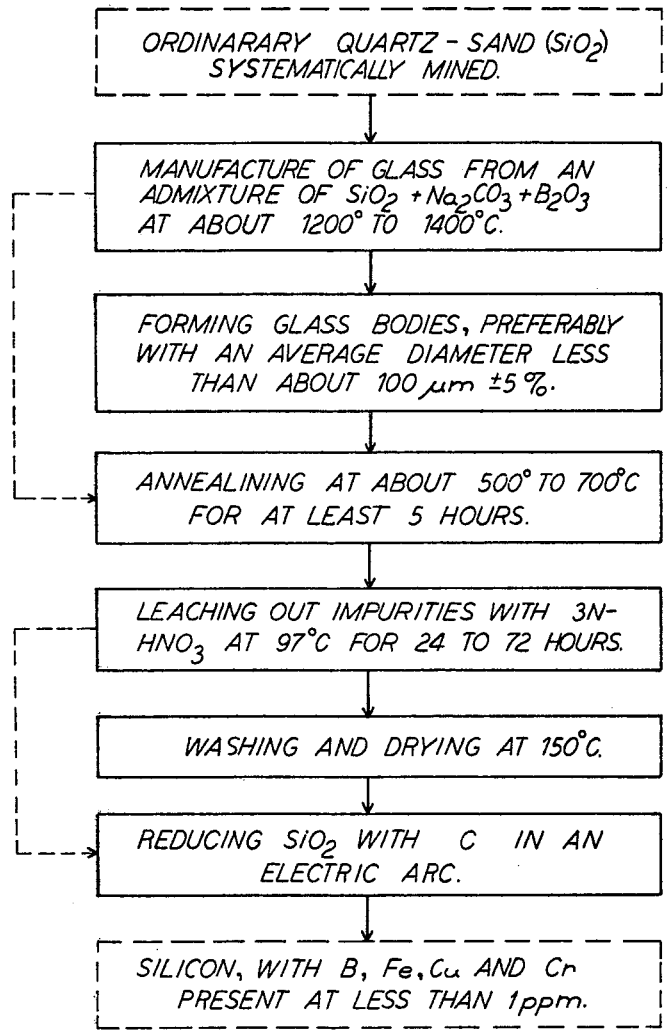

PROCESS FOR MANUFACTURING SI USEFUL FOR SEMICONDUCTOR COMPONENTS FROM QUARTZ SAND

BACKGROUND OF THE INVENTION

1. Field of the Invention

The invention relates to the production of Si and somewhat more particularly to a process of manufacturing Si for semi-conductor components, such as solar cells, whereby quartz sand is utilized as the initial raw material and the Si is obtained through reduction of $SiO_2$ in an electrical arc.

2. Prior Art

The technical fields of application for Si known in semiconductor technology is limited by the degree of purity of the raw or source material thereof. As is known, so-called technical-grade silicon (having a purity of about 98%) is manufactured from quartz sand and carbon in an electrical arc and contains as major impurities, iron, boron and phosphorus. Boron and phosphorus have particularly detrimental effects on any semiconductor components produced from such silicon because these elements decisively affect the conductivity characteristics of the semiconductor material.

Therefore, in order to produce highly purified Si for semiconductor purposes, through reduction of $SiO_2$ in an electrical arc, quartz sand with a low impurity level is required as the raw or source material. However, quartz sand with the necessary degree of purity is available world-wide only to a limited extent and is thus very expensive. On the other hand, if one utilizes as the Si source material, ordinary quartz sand which has been systematically mined, the demanded degree of purity cannot be obtained through the electrical arc reduction process.

German Offenlegungsschrift No. 26 23 413, which is essentially equivalent to U.S. Pat. No. 4,097,584, describes a method for manufacturing highly purified silicon for semiconductor components whereby, after the reduction of $SiO_2$ with carbon in an electrical arc, the silicon, which still contains impurities (98% purity) is treated in its moltent state in the presence of water, with hydrogen or hydrogen-containing compounds so that phosphorus present in such silicon escapes therefrom in the form of phosphorus hydride (or hydrogen phosphite) whereas boron remains in the form of boron oxide in the slag on top of the moltent silicon and can be readily separated therefrom. This procedure is preferably conducted in a reactor at sub-atmospheric pressures. The so-obtained silicon has an impurity level of less than about 1 ppm of boron and phosphorus therein.

SUMMARY OF THE INVENTION

The invention provides a process of producing highly refined silicon from ordinary quartz sand in such a manner that the so-obtained silicon can be directly used for the manufacture of semiconductor components.

In accordance with the principles of the invention, ordinary quartz sand is processed through a combination of sequential steps to yield relatively pure silicon (having less than about 1 ppm of electrically effective impurities therein). This combination of steps comprises (a) admixing ordinary quartz sand with suitable glass-forming materials and transforming such admixture into glass by melting the material admixture; (b) annealing the so-obtained glass so as to obtain phase separation therein comprised of a $SiO_2$-rich phase and a so-called soft phase or impurity-rich phase; (c) extracting the impurity-rich phase via an acid treatment and/or an alkali treatment; and (d) reducing the remaining $SiO_2$ with a carbon-containing material or compound in an electrical arc.

In certain preferred embodiments of the invention, the glass melt obtained from the quartz sand glass-forming material admixture is converted into solid bodies having relatively large surface areas and relatively small thicknesses, such as fibers, foils or bands, having a thickness less than about 100 $\mu m$ ($\pm 5\%$).

In certain preferred embodiments of the invention, the glass-forming material comprises boron oxide and alkali-metal carbonates and/or oxides, with the preferred alkali-metal carbonate being soda ($Na_2CO_3$). Preferably, the sand-glass forming material admixture is controlled so that a glass obtained therefrom has a $SiO_2$ concentration therein which ranges between about 55 to 70%, by total weight of glass. Preferably, such material admixture is transformed into glass at temperatures in the range of about 1200° to 1400° C.

In certain preferred embodiments of the invention, phosphorus pentoxide and/or carbon-containing materials, such as graphite, sucrose or starch are added to the glass melt prior to annealing thereof.

In preferred embodiments of the invention, the annealing process occurs at a temperature in the range of about 500° to 700° C. over a time period of at least about 5 hours.

In certain preferred embodiments of the invention, the acid extraction process occurs with 3N nitric acid at a temperature in the range of about 90° to 100° C., most preferably at about 97° C. over a time period of at least about 20 hours. After the acid treatment, the glass can, optionally, be further leached with dilute alkali solutions and thereafter be washed, as with distilled water, and dried at about 150° C.

In preferred embodiments of the invention, during the reduction of the leached-out glass ($SiO_2$) in an electrical arc, carbon-containing compounds, preferably sucrose and/or starch are added.

The purified silicon obtained in accordance with the principles of the invention is suitable for direct use in the fabrication of semiconductor components, most preferably solar cells.

BRIEF DESCRIPTION OF THE DRAWING

The FIGURE is a flow-diagram illustrating, in solid lines, a preferred sequence of processing steps, and in dotted lines an optional sequence of steps for practicing the principles of the invention.

DESCRIPTION OF PREFERRED EMBODIMENTS

The invention provides a process for producing highly purified silicon from quartz sand so that it can be used directly in fabrication of semiconductor components.

In accordance with the principles of the invention, ordinary quartz sand is uniformly admixed with suitable glass-forming materials and transformed, via melting, into glass. The so-obtained glass is annealed at elevated temperatures somewhat below those used for melting the sand and glass-forming material admixture to obtain a phase separation comprised of $SiO_2$-rich phase and a so-called soft-phase or impurity-rich phase, containing substantially all of the impurities formed from the material admixture. As an optional, but preferred step, the glass can first be formed into solid bodies having relatively large surface areas and relatively small thicknesses prior to annealing to facilitate further work with the glass. The impurity-rich phase in the annealed glass is then leached out or extracted by an acid and/or alkali treatment. Optionally, but preferably, the leached-out glass is washed and dried and is then reduced with carbon or a carbon-containing material in an electric arc to yield a highly refined silicon with B, Fe, Cu and Cr present therein at concentrations less than about 1 ppm.

The phase separation-leaching out process is carried out in a somewhat similar fashion in the glass industry (see U.S. Pat. No. 2,215,039) during manufacture of tubes composed of VYCOR glass (a registered trademark for heat and chemical resistant glass) and which yields transparent glass tubes composed of 96% $SiO_2$ and 4% boron.

In a preferred embodiment of the invention, the glass phase obtained through melting of the quartz sand and suitable glass-forming materials, is, prior to annealing, converted into a body structure, such as a fiber, tape or foil structure. A primary consideration in forming such bodies is that they have a relatively very large surface area and a relatively small or minimum, but uniform diameter or thickness, which preferably ranges between about 20 to 100 $\mu$m ($\pm$5%).

In an exemplary embodiment of the invention, a substantially uniform admixture of boron oxide and alkali-metal carbonates and/or alkali-metal oxides, preferably soda, is heated up in a suitable melting vat or crucible at a temperature of about 1200° to 1400° C., along with appropriate amounts of quartz sand so as to obtain a substantially uniform molten glass. After homogenization and clarification, suitable bodies, such as fibers, foils, bands, sheets or tapes are drawn-off from nozzles provided along the base of the melting vat at relatively high speeds ranging from about 700 m/sec and preferably being in the range of about 60 to 3000 m/min and wound onto large diameter storage drums. During this drawing process, the glass melt in the vat is constantly replenished or supplemented so that the level thereof in the vat remains relatively constant. Techniques for melting large glass batches and forming bodies at relatively high drawing-off speeds are known in the art.

The formed glass bodies, which may be divided into convenient lengths if desired, are annealed at a temperature of about 500° to 700° C. for at least about 5 hours. During the annealing step, a phase separation occurs in the glass whereby impurities (iron, copper, chromium and other transition metals) accumulate in the alkali-rich (soft) phase, sometimes referred to herein and in the claims as the impurity-rich phase (see U.S. Pat. No. 3,650,721).

In order to obtain effective phase separation, the glass composition should be so-selected that two phases of varying composition are not present in the glass matrix in the form of "isolated islands" and are instead connected with one another through a channel system or network. As an exemplary glass composition suitable for practicing the principles of the invention, appropriate amounts of quartz sand, boron oxide and sodium carbonate (soda) are loaded into a melting crucible composed of quartz glass or platinum and heated to a temperature in the range of about 1200° to 1400° C. to obtain a moltent sodium boron silicate glass having a composition corresponding to about 55 to 70% by weight $SiO_2$; about 15 to 35% by weight $B_2O_3$ and about 5 to 10% by weight of $Na_2O$.

After completion of the phase separation, the glass, preferably in a form of fibers, foils, tapes or sheets, is immersed into a strong acid bath, preferably 3N nitric acid, so as to leach out the $Na_2O$-$B_2O_3$-rich phase, which contains substantially all the impurities originally present in the glass. This leaching process occurs at a temperature in the range of about 90° to 100° C. (preferably at 97° C.) and extends over a prolonged time period of at least 20 hours and generally ranges from about 24 to 72 hours, depending upon thickness or diameter of the glass body being subjected to the leaching process. A washing process with dilute lye solutions or water may, optionally, follow the leaching-out process.

In a modified phase separation step, due to the large surface area and the minimal thickness of the glass bodies being treated, the acid-soluble phase or impurity-rich phase can be quantitatively extracted or removed so that, following the termination of the leaching-out process, a porous glass body consisting of substantially pure $SiO_2$ remain having a boron concentration of less than 100 ppm therein. During a demonstration of the inventive process as above described, the concentration of iron, copper and chromium in such porous glass bodies was spectro-analytically ascertained to be less than 1 ppm.

In a further embodiment of the invention, in order to accelerate the phase separation and/or the leaching-out steps, one can, optionally, add to the $Na_2O$-$B_2O_3$-$SiO_2$ glass relatively small amounts of phosphorus pentoxide ($P_2O_5$) during the initial melting process. Further, instead of the $NaO_2$, other alkali metal oxides, such as, for example, potassium oxide, lithium oxides or mixtures thereof with $Na_2O$ can also be utilized in the practice of the invention. In addition, during the glass manufacture, graphite or other carbon-containing materials or compounds can be added to the glass melt.

After the leaching out process, the glass bodies, consisting of a relatively highly refined $SiO_2$ can, if desired, be washed with distilled water, dried at about 150° C. and thereafter be reduced with a carbon-containing compound, such as sucrose or starch in an electrical arc. As stated earlier, in certain embodiments, it is preferable to add graphite or carbon-containing compounds to the melt during the glass manufacture. In this manner, one obtains, after the leaching-out step, a highly purified $SiO_2$ glass body which has, embedded in its matrix, homogeneously distributed carbon particles therein necessary for the reduction. Through an intimate contact of carbon particles in the $SiO_2$-skeleton or porous body structure, a quantitative reduction in the electrical arc takes place.

The drawing illustrates, in flow diagram form, at least some of the essential processing steps and some of the optional processing steps utilized in the practice of the invention and is, essentially, self-explanatory.

As is apparent from the foregoing specification, the present invention is susceptible of being embodied with various alternations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

We claim as our invention:

1. In a method of producing silicon which is useful for fabrication of semiconductor components, such as solar cells, wherein quartz sand is utilized as a starting material and silicon is obtained through reduction of silicon dioxide in an electrical arc process, the improvement comprising:
   (a) admixing select amounts of quartz sand with suitable amounts of glass-forming materials and melting such admixture and converting it into glass;
   (b) annealing the so-obtained glass at an elevated temperature below the temperature utilized to form such glass to that a phase-separation occurs comprised of a silicon dioxide-rich phase and an impurity-rich phase;
   (c) subjecting the so-annealed glass to a leaching-out process with an acid and/or lye so that the impurity-rich phase is extracted; and
   (d) admixing the remaining silicon dioxide-rich glass with a carbon-containing compound and reducing such glass to silicon in an electrical arc.

2. In a method as defined in claim 1 wherein the glass obtained through melting of the quartz sand and glass-forming materials if formed into bodies having relatively large surface areas and relatively small thicknesses of less than about 100 $\mu$m ($\pm$5%) prior to annealing.

3. In a method as defined in claim 1 wherein the glass-forming materials comprise boron oxide and alkali-metal carbonates or oxides.

4. In a method as defined in claim 3 wherein the alkali-metal carbonate is sodium carbonate.

5. In a method as defined in claim 1 wherein the amount of quartz sand and glass-forming materials are so-selected that the resultant glass has a silicon dioxide concentration ranging from about 55 to 70% by weight of glass.

6. In a method as defined in claim 1 wherein said glass is produced by heating the quartz sand and glass-forming materials to a temperature in the range of about 1200° to 1400° C.

7. A method as defined in claim 1 wherein controlled amounts of phosphorus pentoxide are added to the melt during glass manufacture.

8. A method as defined in claim 1 wherein controlled amounts of carbon-containing compounds are added to the melt during glass manufacture.

9. In a method as defined in claim 1 wherein controlled amounts of phosphorus pentoxide and carbon-containing compounds are added to the melt during glass manufacture.

10. In a method as defined in claim 1 wherein the annealing process occurs at a temperature in the range of about 500° to 700° C. over a time period of at least 5 hours.

11. In a method as defined in claim 1 wherein the leaching-out process occurs with 3N-nitric acid at a temperature in the range of about 90° to 100° C. over a time period of at least about 20 hours.

12. A method as defined in claim 11 wherein the leaching-out process occurs at a temperature of about 97° C.

13. A method as defined in claim 11 wherein the leaching-out process includes subjecting the glass to a dilute lye solution after the acid treatment.

14. A method as defined in claim 11 wherein the glass is washed with distilled water and dried at about 150° C. after said leaching-out process.

15. A method as defined in claim 1 wherein the glass obtained through melting of the quartz sand and glass-forming materials is formed into glass fibers, glass tapes or glass foils which are drawn-off from the glass melt at a rate of about 60 to 3000 m/minute.

16. In a method as defined in claim 1 wherein the glass obtained through melting of the quartz sand and glass-forming materials is formed into fibers via the nozzle blow-molding process at a rate of about 6000 m/minute.

17. In a method as defined in claim 1 wherein the carbon-containing compound added to the silicon dioxide-rich glass are selected from the group consisting of sucrose, starch, graphite and mixtures thereof.

18. A method of producing relatively pure silicon from quartz sand containing a relatively high amount of impurities therein, comprising the sequential steps of:
   (a) admixing a select amount of such quartz sand with controlled amounts of boron oxide and sodium carbonate and heating the resultant admixture to a temperature in the range of about 1200° to 1400° C. so as to obtain a glass melt;
   (b) forming glass bodies from such glass melt so that such bodies have an average diameter of less than about 100 $\mu$m$\pm$5%;
   (c) annealing the so-formed bodies at a temperature of about 500° to 700° C. for at least about 5 hours so that a phase separation occurs comprised of a silicon dioxide-rich phase and an impurity-rich phase;
   (d) leaching-out said impurity-rich phase from said bodies with 3N-nitric acid at a temperature in the range of about 90° to 100° C. over a time period extending from about 24 to 72 hours;
   (e) washing the leached-out glass bodies with a dilute lye solution and/or water and drying the resultant glass bodies at a temperature of about 150° C.; and
   (f) reducing the silicon dioxide in such glass bodies with carbon in an electrical arc so as to obtain relatively pure silicon.

* * * * *